US010081713B2

(12) United States Patent
Huijs et al.

(10) Patent No.: US 10,081,713 B2
(45) Date of Patent: Sep. 25, 2018

(54) POLYETHERIMIDE-FIBER COMPOSITES

(71) Applicant: SABIC GLOBAL TECHNOLOGIES B.V., Bergen op Zoom (NL)

(72) Inventors: Franciscus Maria Huijs, Bergen op Zoom (NL); Elena Miloskovska, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/039,474

(22) PCT Filed: Dec. 30, 2014

(86) PCT No.: PCT/IB2014/067428
§ 371 (c)(1),
(2) Date: May 26, 2016

(87) PCT Pub. No.: WO2015/114427
PCT Pub. Date: Aug. 6, 2015

(65) Prior Publication Data
US 2016/0376412 A1 Dec. 29, 2016

Related U.S. Application Data

(60) Provisional application No. 61/934,303, filed on Jan. 31, 2014.

(51) Int. Cl.
*C08L 63/00* (2006.01)
*C08J 5/04* (2006.01)
*C08J 5/06* (2006.01)

(52) U.S. Cl.
CPC .................. *C08J 5/042* (2013.01); *C08J 5/06* (2013.01); *C08J 2379/08* (2013.01)

(58) Field of Classification Search
CPC ........... C08J 5/042; C08J 5/06; C08J 2379/08
USPC .......................................................... 523/440
See application file for complete search history.

(56) References Cited

U.S. PATENT DOCUMENTS

| 3,806,489 A | 4/1974 | Rieux et al. |
| 4,293,684 A * | 10/1981 | Takekoshi .......... C08G 73/1071 528/125 |
| 2006/0258810 A1* | 11/2006 | Sugiura ..................... C08J 5/06 525/207 |
| 2011/0263791 A1* | 10/2011 | Chiong .............. C08G 73/1014 525/132 |

(Continued)

FOREIGN PATENT DOCUMENTS

| CA | 1218569 | 3/1987 |
| CA | 2861235 A1 | 7/2013 |
| CN | 103103774 | 5/2015 |

OTHER PUBLICATIONS

International Search Report for International Patent Application No. PCT/IB2014/067428; International Application Filing Date Dec. 30, 2014, dated Mar. 31, 2015; 5 pages.

(Continued)

*Primary Examiner* — David T Karst
(74) *Attorney, Agent, or Firm* — Cantor Colburn LLP

(57) ABSTRACT

Described herein is a composite comprising a matrix comprising a polymeric material; and at least one sized fiber selected from the group consisting of polyetherimide-sized fibers, epoxy-sized fibers, and combinations thereof.

18 Claims, 5 Drawing Sheets

(56) References Cited

U.S. PATENT DOCUMENTS

2012/0123053 A1    5/2012    Kibayashi et al.
2013/0224470 A1    8/2013    Vautard et al.

OTHER PUBLICATIONS

Kern et al.; "Simulated space environmental effects on a polyetherimide and its carbon fiber-reinforced composites"; Sampe Journal vol. 29 No. 3; Jun. 1993; pp. 29-35, 36-44; Abstract 2 pages.
Written Opinion for International Application No. PCT/IB2014/067428, International Filing Date Dec. 30, 2014, dated Mar. 31, 2015, 9 pages.
"Polyetherimide—Wkipedia", Oct. 7, 2013 (Oct. 7, 2013), XP055337935, Retrieved from the Internet: URL:https://en.wikipedia.org/w/index.php?title=Polyetherimide&oldid=576146635 [retrieved on Jan. 23, 2017]
Donald J. Plazek et al: "Physical Properties of Polymer Handbook, Chapter 12" Dec. 1, 2006 (Dec. 1, 2006), Springer, XP055463895, p. 212.

\* cited by examiner ial application of PCT/IB14/067428, filed Dec. 30, 2014, which claims the benefit of U.S. Provisional Application No. 61/934,303 filed Jan. 31, 2014, both of which are incorporated by reference in their entirety herein.

BACKGROUND

In many different applications there is a need for thermoplastic materials that combine high strength and low weight. To meet these needs, fiber reinforced plastics have been developed. A special class is the carbon fiber reinforced plastics that combine a very high strength with the low density of organic materials. While these materials offer very high strength there is a continued need for greater strength materials.

BRIEF DESCRIPTION

Described herein is a composite comprising a matrix comprising a polymeric material; and at least one sized fiber selected from the group consisting of polyetherimide-sized fibers, epoxy-sized fibers, and combinations thereof. The at least one sized fiber is embedded in the matrix comprising the polymeric material.

Also described herein is a composite comprising a polyetherimide matrix and at least one sized carbon fiber selected from the group consisting of polyetherimide-sized carbon fibers, epoxy-sized carbon fibers, and combinations thereof. The at least one sized carbon fiber is embedded in the polyetherimide matrix.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
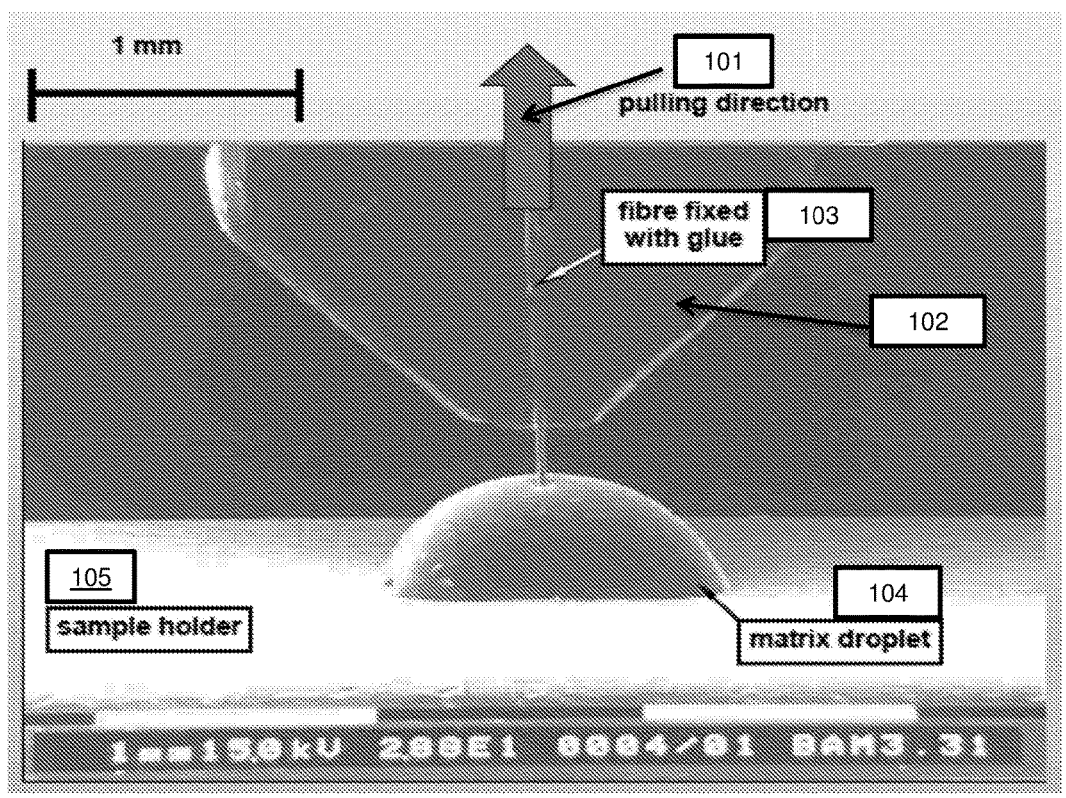
FIG. 1 is a photograph of a carbon fiber embedded in thermoplastic polymer droplet.

The interfacial shear strength between the fibers and matrix is a crucial factor for obtaining composites with excellent mechanical properties. The interfacial shear strength is used to estimate the interface adhesion in each fiber-matrix system which is strongly dependent on the sizing chemistry of the fibers and the chemical composition of the matrix. Therefore, compatible chemistries are expected to result in stronger interfacial adhesion and hence, excellent mechanical properties of the composite.

Described herein is a composite comprising a matrix comprising a polymeric material; and at least one sized fiber selected from the group consisting of polyetherimide-sized fibers, epoxy-sized fibers, and combinations thereof. The at least one sized fiber is embedded in the matrix comprising the polymeric material.

The polymeric material can include aromatic polyketone, polyetheretherketone (PEEK), polyphenylsulfone (PPSU), polybenzimidazoles (PBI), polyethersulfone (PESU), polysulfone (PSU), polycarbonate (PC), polyphenylene ether (PPE), polyphenylene sulfide (PPS), and polyetherimide (PEI) polymers and copolymers. Both polymers and copolymers of any of the above-identified polymeric materials may be used.

The aromatic polyketones can be any aromatic polyketone including polyaryl ether ketones and polyether ether ketones. The aromatic polyketone comprises repeating units of Formula (I)

(I)

wherein Ar is independently at each occurrence a substituted or unsubstituted, monocyclic or polycyclic aromatic group having 6 to 30 carbons. Exemplary Ar groups include phenyl, tolyl, napthyl, and biphenyl. Additional aromatic groups are disclosed in WO 02/02158. The aromatic polyketone can be a polyaryletherketone in which case it comprises repeating units of Formula (I) and repeating units of Formula (II)

(III)

wherein Ar is defined as above. The Ar in Formula (I) and Formula (II) can be the same or different.

In some embodiments the aromatic polyketone comprises a polyetheretherketone. Polyetheretherketone comprise repeating units of Formula (III)

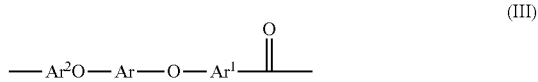
(III)

wherein Ar is as described above and $Ar^1$ and $Ar^2$ are independently at each occurrence a substituted or unsubstituted, monocyclic or polycyclic aromatic group having 6 to 30 carbons. Ar, $Ar^1$, and $Ar^2$ may be the same as or different from each other. Additionally, two of Ar, $Ar^1$, and $Ar^2$ may be the same as each other and the third may be different. In some embodiments Ar, $Ar^1$, and $Ar^2$ are phenyl groups.

Aromatic polyketones are well known and commercially available. Examples of commercially available aromatic polyketones include PEEK™ polymers by VICTREX.

Polybenzimidazoles comprise recurring units of the following Formulas IV and V. Formula IV is:

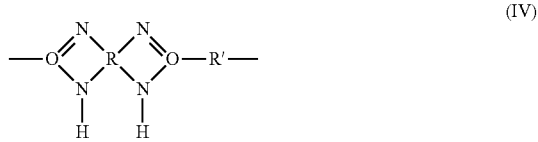
(IV)

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R is a member of the class consisting of (1) an aromatic ring, (2') an alkylene group (preferably those having 4 to 8 carbon atoms), and (3') a heterocyclic ring from the class consisting of (a) pyridine, (b) pyrazine, (c) furan, (d) quinoline, (e) thiophene, and (f) pyran. Formula V is:

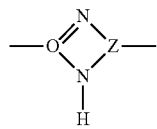

(V)

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas IV and V wherein R is an aromatic ring or a heterocyclic ring. Polybenzimidazoles are further described in U.S. Pat. No. 3,699,038.

"Polycarbonate" as used herein means a polymer or copolymer having repeating structural carbonate units of formula (1)

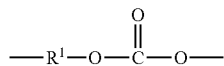

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

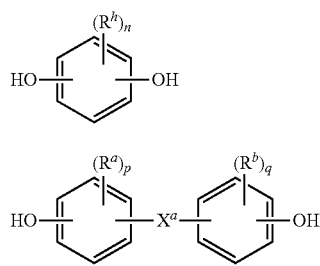

(2)

(3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Specific dihydroxy compounds include resorcinol, 2,2-bis(4-hydroxyphenyl) propane ("bisphenol A" or "BPA", in which in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane (DMBPC), and from bisphenol A and 1,1-bis(4-hydroxy-3-methylphenyl)-3,3,5-trimethylcyclohexane (isophorone bisphenol).

Poly(phenylene ether) comprises repeating structural units of formula (VI)

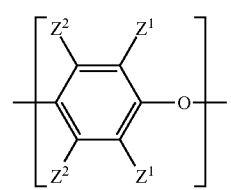

(VI)

wherein for each structural unit, each $Z^1$ is independently halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

The poly(phenylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(phenylene ether) may be in the form of a homopolymer; a copolymer; a graft copolymer; an ionomer; or a block copolymer; as well as combinations comprising at least one of the foregoing. Poly(phenylene ether) includes polyphenylene ether comprising 2,6-dimethyl-1,4-phenylene ether units optionally in combination with 2,3,6-trimethyl-1,4-phenylene ether units.

The poly(phenylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The polyetherimide can be selected from polyetherimide homopolymers, e.g., polyetherimides, polyetherimide copolymers, e.g., polyetherimide sulfones, and combinations thereof. Polyetherimides include, but are not limited to, known polymers, such as those sold by SABIC Innovative Plastics under the Ultem*, Extern*, and Siltem* brands (Trademark of SABIC Innovative Plastics IP B.V.).

In one embodiment, the polyetherimides are of formula (4):

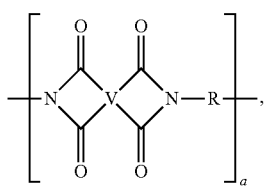

(4)

wherein a is more than 1, for example 10 to 1,000 or more, or more specifically 10 to 500. The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) saturated, unsaturated or aromatic monocyclic and polycyclic groups having 5 to 50 carbon atoms, substituted with ether groups, arylene sulfone groups, or a combination of ether groups and arylene sulfone groups; and (b) linear or branched, saturated or unsaturated alkyl groups having 1 to 30 carbon atoms and substituted with ether groups or a combination of ether groups, arylene sulfone groups, and arylene sulfone groups; or combinations comprising at least one of the foregoing. Suitable additional substitutions include, but are not limited to, amides, esters, and combinations comprising at least one of the foregoing.

The R group in formula (4) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (5):

(5)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include, but are not limited to, tetravalent aromatic groups of formula (6):

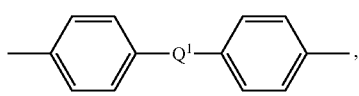

(6)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (7):

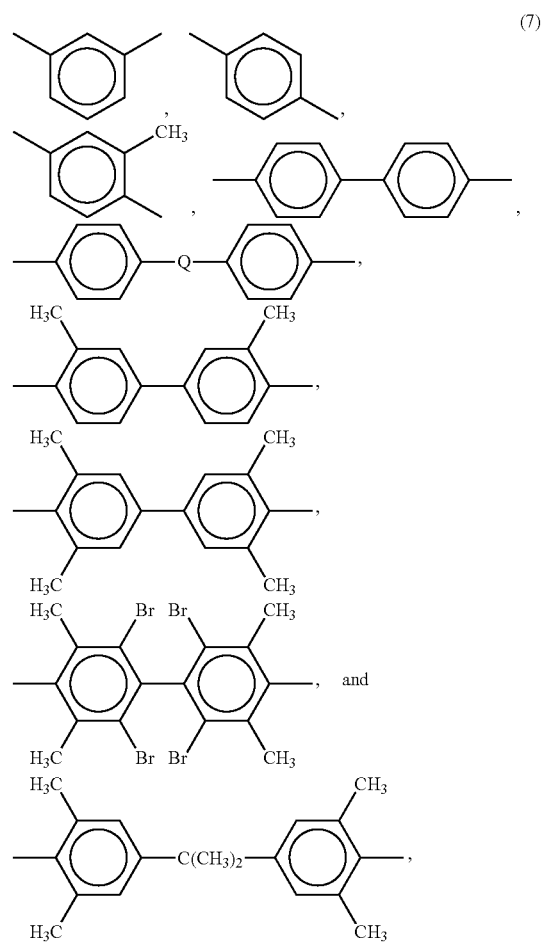

(7)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In a specific embodiment, the polyetherimide comprises more than 1, specifically 10 to 1,000, or more specifically, 10 to 500 structural units, of formula (8):

(8)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (7) as defined above; and R is a divalent group as defined above in formula (4).

In another specific embodiment, the polyetherimide sulfones are polyetherimides comprising ether groups and sulfone groups wherein at least 50 mole % of the linkers V and the groups R in formula (4) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (9):

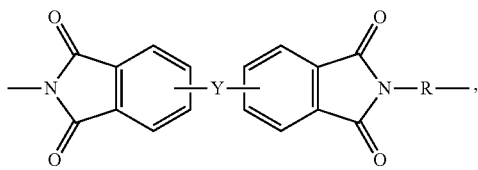

(9)

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (7) as defined above and R is a divalent group of formula (4) as defined above, provided that greater than 50 mole % of the sum of moles Y+moles R in formula (2) contain —SO$_2$— groups.

It is to be understood that the polyetherimides and polyetherimide sulfones can optionally comprise linkers V that do not contain ether or ether and sulfone groups, for example linkers of formula (10):

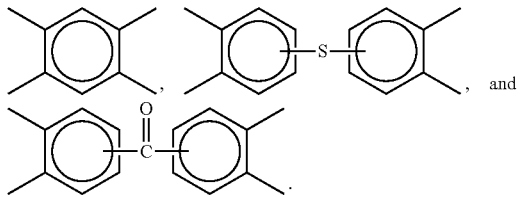

(10)

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (8) and the polyetherimide sulfone contains 10 to 500 structural units of formula (9).

The polyetherimide and polyetherimide sulfones can be prepared by various methods, including, but not limited to, the reaction of a bis(phthalimide) of formula (11):

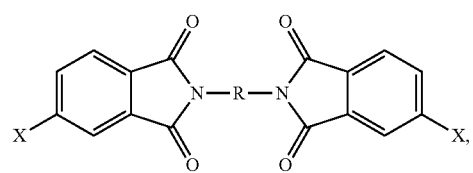

(11)

wherein R is as described above and X is a nitro group or a halogen. Bis-phthalimides (11) can be formed, for example, by the condensation of the corresponding anhydride of formula (12):

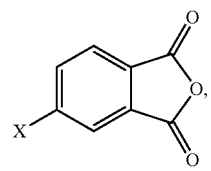

(12)

wherein X is a nitro group or halogen, with an organic diamine of the formula (13):

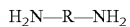

H$_2$N—R—NH$_2$ (13), wherein R is as described above in relation to formula (4).

Illustrative examples of amine compounds of formula (13) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3, 5-diethylphenyl) methane, bis (4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1, 3-diamino-4-isopropylbenzene, bis(4-aminophenyl) ether and 1,3-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl) sulfones (BAPS). Combinations comprising any of the foregoing amines can be used.

The polyetherimides can be synthesized by the reaction of the bis(phthalimide) (11) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No.

5,229,482. Specifically, the dihydroxy substituted aromatic hydrocarbon is a bisphenol such as bisphenol A. A combination of an alkali metal salt of a bisphenol and an alkali metal salt of another dihydroxy substituted aromatic hydrocarbon can be used.

In one embodiment, the polyetherimide comprises structural units of formula (8) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). In one embodiment the polyetherimide sulfone comprises structural units of formula (9) wherein at least 50 mole % of the R groups are of formula (7) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination with each other and/or other of the disclosed polymeric materials in fabricating the polymeric components of the invention. In one embodiment, only the polyetherimide is used. In one embodiment, the weight ratio of polyetherimide:polyetherimide sulfone can be from 99:1 to 50:50.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (14):

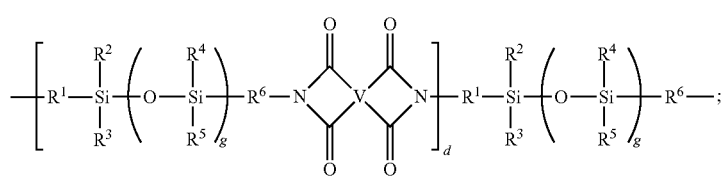

(14)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997; 4,808,686 a polyetherimide sulfone resin, as described in U.S. Pat. No. 7,041,773 and combinations thereof. Each of these patents are incorporated herein their entirety.

The polyetherimides can be terminated (end-capped) with an end capping agent such as para-cumyl phenol, an aliphatic amine, or an aromatic amine.

The polyetherimide can have varying amounts of hydroxyl groups. The amount of hydroxyl groups can be greater than or equal to 100 ppm and less than or equal to 600 ppm. More specifically, the amount of hydroxyl groups can be 200 to 600 ppm, or, more specifically 400 to 600 ppm.

The polyetherimides can have a weight average molecular weight (Mw) of 5,000 to 100,000 grams per mole (g/mole) as measured by gel permeation chromatography (GPC) using polystyrene standards. In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

The fiber includes carbon fiber, glass fiber, aramid fiber, polyparaphenylene terephthalamide fiber, and combinations thereof. The fiber can have a circular or a non-circular cross-section. In one embodiment, flat glass fibers can be used. The fiber can include S-Glass, E-Glass, Continuous Glass, industrial carbon fibers, aerospace carbon fibers, continuous carbon fibers, and combinations thereof. The amount of the fiber can vary, depending on the application and can range from more than 0 to less than or equal to 60 weight %, based on the combined weight of fiber and polymeric material.

The polyetherimide-sized fiber can have a sizing percentage of greater than 0 to 7 weight percent, or, more specifically, a sizing percentage of more than 0 to 5 weight percent, based on the weight of the fiber.

The polyetherimide-sized fiber can have a diameter of 1 to 20 micrometers (μm), or, more specifically 2 to 15 μm.

The polyetherimide-sized fiber can have a density of 0.5 to 7 grams per cubic centimeter (g/cm$^3$), or, more specifically, 1 to less than 4 g/cm$^3$.

The epoxy-sized fiber can have a sizing percentage of greater than 0 to 7 weight percent, or, more specifically, a sizing percentage of more than 0 to 5 weight percent, based on the weight of the fiber.

The epoxy-sized fiber can have a diameter of 1 to 20 micrometers (μm), or, more specifically 2 to 15 μm.

The epoxy-sized fiber can have a density of 0.5 to 7 grams per cubic centimeter (g/cm$^3$), or, more specifically, 1 to less than 4 g/cm$^3$.

The polyetherimide matrix can be a chloro-displaced polyetherimide matrix. The carbon fiber can be a polyetherimide-sized carbon fiber. The composite comprising the chloro-displaced polyetherimide matrix and the polyetherimide-sized carbon fiber can have an interfacial shear strength of 65 to 500 megaPascals (MPa), or, more specifically, 66 to 300 MPa, or, more specifically, 68 to 120 MPa.

The carbon fiber can be an epoxy-sized carbon fiber. The composite comprising the chloro-displaced polyetherimide matrix and the epoxy-sized carbon fiber can have an interfacial shear strength of 65 to 500 MPa, or, more specifically, 70 to 300 MPa, or, even more specifically 73 to 120 MPa.

The polyetherimide matrix can be a para-cumyl phenol terminated polyetherimide. The carbon fiber can be a polyetherimide-sized carbon fiber. The composite comprising the para-cumyl phenol terminated polyetherimide matrix and the polyetherimide-sized carbon fiber can have an interfacial shear strength 57 to 500 MPa, or, more specifically, 60 to 300 MPa, or, even more specifically, 60 to 120 MPa.

The composite comprising the para-cumyl phenol terminated polyetherimide matrix and the epoxy-sized carbon fiber can have an interfacial shear strength of 57 to 500 MPa, or, more specifically 65 to 300 MPa, or, even more specifically, 68 to 120 MPa The polyetherimide matrix can be an aliphatic amine terminated polyetherimide. The composite can comprising an aliphatic amine terminated polyetherimide matrix and polyetherimide-sized carbon fiber can have an interfacial shear strength of 57.7 to 500 MPa, or, more specifically, 60 to 300 MPa, or, even more specifically, 60 to 120 MPa.

The composite comprising an aliphatic, amine terminated polyetherimide matrix and epoxy-sized carbon fiber can have an interfacial shear strength of 55 to 500 MPa, or, more specifically 65 to 300 MPa, or, even more specifically 70 to 120 MPa.

The polyetherimide matrix can be an aromatic amine terminated polyetherimide. The composite comprising the aromatic amine terminated polyetherimide matrix and epoxy-sized carbon fiber can have an interfacial shear strength of 52 to 500 MPa, or, more specifically, 60 to 300 MPa, or, even more specifically, 65 to 120 MPa.

The composite comprising an aromatic amine terminated polyetherimide matrix and polyetherimide-sized carbon fiber can have an interfacial shear strength of 52 to 500 MPa, or, more specifically, 54.6 to 300 MPa, or, even more specifically, 54.6 to 120 MPa.

Advantageously, the composites encompassed by the invention provide useful properties and can be used to make various articles in numerous markets and industries. In automotive industries, for instance, wheels, body panels, and under the hood articles can be made with our composites. In sporting goods, the composites can be used to make bicycle frames, tennis rackets, golf clubs, boats and canoes. For aerospace, composites can be used to make microair vehicles, ultra light aviation devices, engine parts, and interior panels. For consumer goods: the composites can be used to make laptops, briefcases, and portable devices. As such, the scope of the invention include article comprising a polyetherimide matrix and at least one sized carbon fiber selected from the group consisting of polyetherimide-sized carbon fibers, epoxy-sized carbon fibers, and combinations thereof. In other embodiments, the scope of the invention includes embodiments where the article is selected from the group consisting of wheels, body panels, under the hood articles, bicycle frames, tennis rackets, golf clubs, boats, canoes, microair vehicles, ultra light aviation devices, engine parts, interior panels, laptops, briefcases, and portable devices, wherein such articles each comprise a polyetherimide matrix and at least one sized carbon fiber selected from the group consisting of polyetherimide-sized carbon fibers, epoxy-sized carbon fibers, and combinations thereof.

EXAMPLES

The invention is further described in the following illustrative examples in which all parts and percentages are by weight unless otherwise indicated.

Examples 1-15

Materials: The fibers used, and the physical properties of the mentioned fibers are shown in the following table 1:

TABLE 1

Physical properties carbon fibers

| | Type of Carbon Fiber | | |
|---|---|---|---|
| | Non-sized Carbon Fiber (CF-A) | Polyetherimide-sized Carbon Fiber (CF-B) | Epoxy-sized Carbon Fiber (CF-C) |
| Commercial grade name and/or Supplier details | Sample obtained from Toho Tenax Europe GmbH | Commercially available as PCS082101 from Toho Tenax Europe GmbH | Commercially available as Tenax® HTS45 from Toho Tenax Europe GmbH |
| Strength [MPa] | 4250 | 4100 | 4500 |
| Modulus [GPa] | 225 | 220 | 240 |
| Tow size [K] | 24 | 24 | 24 |
| Sizing [%] | 0 | 2-3 | 1.3 |
| Filament D [μm] | 7 | 7 | 7 |
| Density [g/cm$^3$] | 1.81 | 1.81 | 1.77 |
| Roughness (by AFM*) | 30.2 | 71.6/30.8 | (in progress) |
| Chemistry of Sizing (by TDS** and ATR/FTIR imaging) | No Sizing | PEI (phenoxy) modified Polyurethane | Epoxy |

*AFM—Atomic Force Microscopy
**TDS—Thermal Desoprtion Spectroscopy

The resins used are shown in the following Table 2:

TABLE 2

| Polymer Matrix | Chemical description |
|---|---|
| Resin A | Polyetherimide made from bisphenol A dianhydride and metaphenylene diamine having a weight average molecular weight of 55.000 |
| Resin B | Para cumyl phenol terminated polyetherimide having a weight average molecular weight of 45.000 |
| Resin C | Aliphatic amine terminated polyetherimide having a weight average molecular weight of 39.400 |
| Resin D | Polyetherimide made from bisphenol A dianhydride and metaphenylene diamine having a weight average molecular weight of 45,000 |
| Resin E | Aniline terminated polyetherimide having a weight average molecular weight of 48.000 |

With the three different carbon fiber materials and the five thermoplastic resins, single fiber composites were prepared following the temperature regime described hereinafter. Afterwards the fiber-matrix shear strength was examined by the single fiber pull-out method.

Fiber Surface Analysis: The surface roughness of the carbon fiber is important because it contributes to mechanical interlocking between the resin and the fiber leading to better adhesion. Atomic Force Microscopy (AFM) height and phase images show the surface morphology of long carbon fibers (LCF). Non-sized LCF shows a smooth surface with ridges and grooves.

PEI sized LCF and epoxy sized LCF shows a non-uniform sizing coating on the surface morphology. The surface also shows longitudinal ridges and grooves. The roughness at area without aggregation of coating materials is around 30 nm, and the roughness with aggregation of coating material is much higher.

Chemical Analysis of Sizing: The chemical analysis was conducted using the Thermal Desorption Spectroscopy (TDS) method and ATR/FTIR imaging method. The analysis gave an indication of the type of sizing present on the carbon fibers. Interestingly, on the surface of the carbon fibers an additional compound was identified as aliphatic long chain 13-Docosenamide, also known as Armoslip 18 and commonly used as lubricant. It was not uniformly dispersed over the carbon fiber surface but more localized in small size domains. It is possibly used to provide additional ease in handling the carbon fibers and prevent damage during handling.

Composite Specimen Preparation: To prevent formation of bubbles during the preparation of the composite, the resin granules were cut into smaller pieces and dried for 5 hours at 150° C. After drying the resin granules/pieces were stored in small containers with silica gel. A metal substrate, designed to fit the test equipment was heated to 340° C. A small piece of resin was positioned and heated to 360° C. until a perfect droplet formed with no bubbles.

A single fiber composite specimen consisted of one fiber segment, embedded upright in a small polymer droplet, which was fixed on a specimen holder. FIG. 1 is a schematic picture of a carbon fiber 103 embedded in thermoplastic polymer droplet 104, disposed on a sample holder 105. The fiber 103 is fixed with glue to a fiber holder 102. The fiber holder 102 can be pulled away from the droplet 104 in a pulling direction 101.

For embedding, the single carbon fiber was dunked into the droplet in fiber direction as shown in the FIG. 1 (this was followed under a microscope). After embedding, the single fiber composite was cooled down to the ambient temperature (the air flow was not controlled) in approximately 5 minutes, approximately at a cooling rate of around 20 to 30 degrees Kelvin/minute (K/min).

The resulting embedding lengths of the specimen vary from approximately 18 to 180 micrometers. Longer embedding lengths lead to forces where fiber break occurs instead of fiber pull-out.

Samples were not tested earlier than 24 hours after preparation. The fiber diameter of each sample was determined under a calibrated light microscope in transmitted light mode.

Single fiber composites were prepared at following temperatures:
Fibers CF-A, CF-B, CF-C with Resin A at 340° C.,
Fibers CF-A, CF-B, CF-C with Resin B at 340° C.,
Fibers CF-A, CF-B, CF-C with Resin C at 310° C.,
Fibers CF-A, CF-B, CF-C with Resin D at 340° C.,
Fibers CF-A, CF-B, CF-C with Resin E at 340° C.

Figure 2:
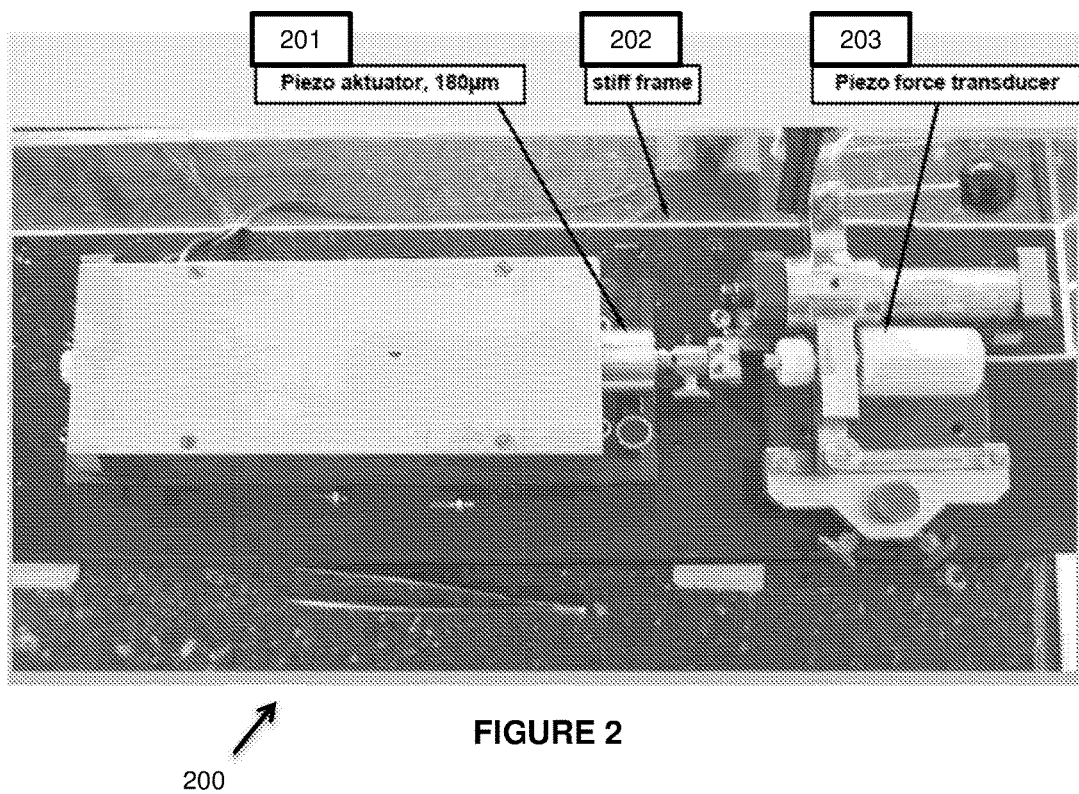
FIG. 2 is a photograph of a microtensile tester used for the single fiber pull-out test.

Single Fiber Pull-out Test: The properties of the composite materials are largely a function of the interaction between the resin and the fiber on the interface. The interfacial shear strength is a parameter that gives an indication for the strength of these interactions. One of the most exploited methods for measuring the interfacial shear strength is the pull-out test. The equipment used to perform the pull-out test is shown in FIG. 2, which shows a microtensile tester 200 used for the single fiber pull-out test. The microtensile tester 200 includes a piezo actuator 201, and a piezo force transducer 203 disposed on a stiff frame 202. The force transducer 203 is a 'Kistler 9207' type having a load between 1 mN and 50N as being the max. The actuator 201 is able to move 180 micrometers in closed loop control. Both components are mounted on a stiff frame. The tests were performed at a constant speed of 1 micrometer/second and ambient temperature of 23° C. The embedding length of the carbon fibers into the resin drop was between 18 to 180 micrometers.

The sample was transferred to the micro tensile tester and the free end of the carbon fiber was glued with super glue on another insert connected to the piezo force transducer. During the test, the pull-out of the single carbon fiber was observed under a microscope.

Figure 3:
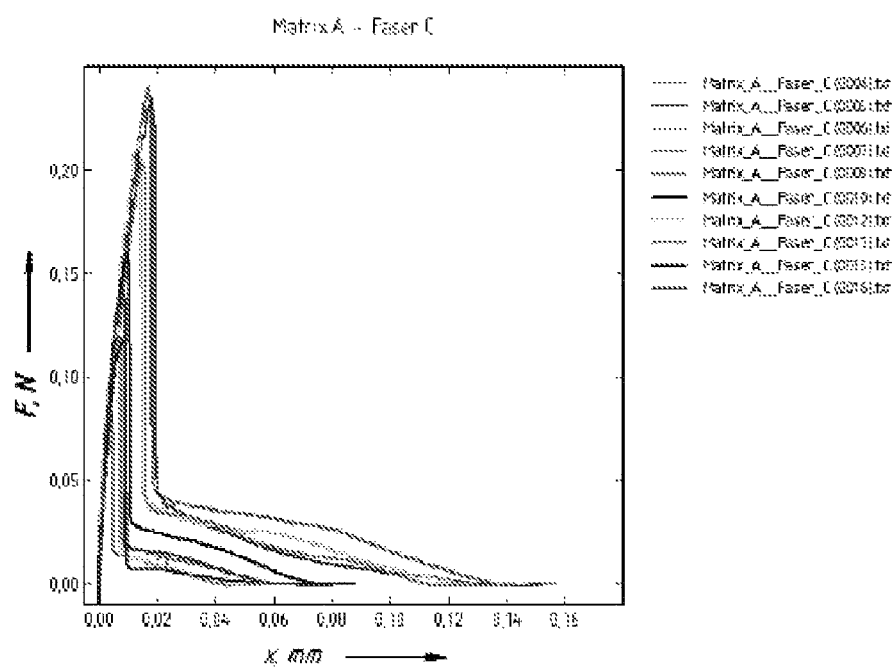
FIG. 3 is a chart illustrating microtensile test data showing the force, as function of fiber displacement, required to pull out the single carbon fiber from the single fiber composite.

FIG. 3 shows exemplary microtensile test data showing the force, as a function of fiber displacement, required to pull out the single carbon fiber from the single fiber composite. This figure is an example of data obtained for each fiber-resin system. The specific values differ significantly from system to system. Only one point is used from each data set. The point used is the maximum force. For each fiber-resin system 10 measurements were performed. These 10 measurements are represented by the plurality of lines in the graph of FIG. 3. Each of the 10 measurements includes a maximum force. From these 10 measurements an average maximum value can be determined as the interfacial shear strength. The specific data of FIG. 3 were generated by performing a pull-out test using resin A, a chloro-displaced polyetherimide, and fiber C, an epoxy sized carbon fiber. This fiber-resin system is shown in Example 1 in Table 3 of this disclosure. FIG. 3 shows the force in Newtons (N) needed for pulling the single fiber from a drop of resin in relation to the displacement in millimeters. The maximum force was used for calculating the interfacial shear strength for the particular fiber-resin system. As reported below, the value of the interfacial shear strength for the particular fiber-resin system C-A, illustrated in FIG. 3, is 76.4 MPa.

The maximum value of the force needed to pull the single carbon fiber out of the single fiber composite is used to calculate the interfacial shear strength between the fiber and the resin using the Kelly-Tyson model.

All tests were performed at ambient temperature of 23° C. The shear strength was determined by a custom-made micro tensile tester (see FIG. 1.2). The displacement is generated by a piezo actuator and the force is recorded by a piezo force transducer. The transducer is a 'Kistler 9207', having a maximal load of $F_{max}$=50N and a force resolution of 1 mN. The actuator is able to move 180 μm in closed loop control. Both components are mounted on a stiff frame. During the test, the specimen holder is mounted at the actuator and the fiber is glued at the force transducer. Tests were performed at a constant speed of 1 μm/s.

Example 1

The purpose of this example was to determine the interfacial shear strength of a carbon fiber in a composite that included a polymer matrix of a chloro-displaced polyetherimide (Resin A) and an epoxy-sized carbon fiber (CF-C). A composite was made from an epoxy-sized carbon fiber and a chloro-displaced polyetherimide, pursuant to the composite specimen preparation method described above. Single fiber pull-out tests were performed as described above. The results indicated that the epoxy-sized carbon fiber had an interfacial shear strength that was 76.4 MPa.

Example 2

The purpose of this example was to determine the interfacial shear strength of a carbon fiber in a composite that included a polymer matrix of a chloro-displaced polyetherimide (Resin A) and a polyetherimide-sized carbon fiber (CF-B). A composite was made from a polyetherimide-sized carbon fiber and a chloro-displaced polyetherimide, pursuant to the specimen preparation method described above. Single fiber pull-out tests were performed as described above. The results indicated that the polyetherimide-sized carbon fiber had an interfacial shear strength that was 70.1 MPa.

Example 3 (Comparative)

The purpose of this example was to determine the interfacial shear strength of a carbon fiber in a composite that included a polymer matrix of a chloro-displaced polyetherimide (Resin A) and an non-sized carbon fiber (CF-A). A composite was made in accordance to the procedure of Example 1, except that the carbon fiber used was not sized. Single fiber pull-out tests were performed as described above. The results indicated that the non-sized carbon fiber had an interfacial shear strength that was 65.8 MPa. Table 3 Summarizes the results of Examples 1-3.

TABLE 3

| | EXAMPLE 1 | EXAMPLE 2 | EXAMPLE 3 (Comparative) |
| --- | --- | --- | --- |
| Polymer Matrix | Chloro-displaced polyetherimide | Chloro-displaced polyetherimide | Chloro-displaced polyetherimide |
| Fiber | CF-C | CF-B | CF-A |
| Average Interfacial Shear Strength (MPa) | 76.4 | 70.1 | 65.8 |

Example 4

The purpose of this example was to determine the interfacial shear strength of a carbon fiber in a composite that included a polymer matrix of a PCP-terminated polyetherimide (Resin B) and an epoxy-sized carbon fiber (CF-C). A composite was made from an epoxy-sized carbon fiber and a PCP-terminated polyetherimide, pursuant to the composite specimen preparation method described above. Single fiber pull-out tests were performed as described above. The results indicated that the epoxy-sized carbon fiber had an interfacial shear strength that was 70.5 MPa.

Example 5

The purpose of this example was to determine the interfacial shear strength of a carbon fiber in a composite that included a polymer matrix of a PCP-terminated polyetherimide (Resin B) and a polyetherimide-sized carbon fiber (CF-B). A composite was made from a polyetherimide-sized carbon fiber and a PCP-terminated polyetherimide, pursuant to the specimen preparation method described above. Single fiber pull-out tests were performed as described above. The results indicated that the polyetherimide-sized carbon fiber had an interfacial shear strength that was 61.8 MPa.

Example 6 (Comparative)

The purpose of this example was to determine the interfacial shear strength of a carbon fiber in a composite that included a polymer matrix of a PCP-terminated polyetherimide (Resin B) and an non-sized carbon fiber (CF-A). A composite was made in accordance to the procedure of Example 4, except that the carbon fiber used was not sized. Single fiber pull-out tests were performed as described above. The results indicated that the non-sized carbon fiber had an interfacial shear strength that was 58.8 MPa. Table 4 summarizes the results of Examples 4-6.

TABLE 4

|  | EXAMPLE 4 | EXAMPLE 5 | EXAMPLE 6 (Comparative) |
|---|---|---|---|
| Polymer Matrix | PCP-terminated polyetherimide | PCP-terminated polyetherimide | PCP-terminated polyetherimide |
| Fiber | CF-C | CF-B | CF-A |
| Average Interfacial Shear Strength (MPa) | 70.5 | 61.8 | 58.8 |

Example 7

The purpose of this example was to determine the interfacial shear strength of a carbon fiber in a composite that included a polymer matrix of an aliphatic amine functionalized polyetherimide (Resin C) and an epoxy-sized carbon fiber (CF-C). A composite was made from an epoxy-sized carbon fiber and an aliphatic amine functionalized polyetherimide, pursuant to the composite specimen preparation method described above. Single fiber pull-out tests were performed as described above. The results indicated that the epoxy-sized carbon fiber had an interfacial shear strength that was 74.2 MPa.

Example 8

The purpose of this example was to determine the interfacial shear strength of a carbon fiber in a composite that included a polymer matrix of an aliphatic amine functionalized polyetherimide (Resin C) and a polyetherimide-sized carbon fiber (CF-B). A composite was made from a polyetherimide-sized carbon fiber and an aliphatic amine functionalized polyetherimide, pursuant to the specimen preparation method described above. Single fiber pull-out tests were performed as described above. The results indicated that the polyetherimide-sized carbon fiber had an interfacial shear strength that was 61.4 MPa.

Example 9 (Comparative)

The purpose of this example was to determine the interfacial shear strength of a carbon fiber in a composite that included a polymer matrix of an aliphatic amine functionalized polyetherimide (Resin C) and an non-sized carbon fiber (CF-A). A composite was made in accordance to the procedure of Example 7, except that the carbon fiber used was not sized. Single fiber pull-out tests were performed as described above. The results indicated that the non-sized carbon fiber had an interfacial shear strength that was 57.7 MPa. Table 5 summarizes the results of Examples 7-10.

TABLE 5

|  | EXAMPLE 7 | EXAMPLE 8 | EXAMPLE 9 (Comparative) | EXAMPLE 10 |
|---|---|---|---|---|
| Polymer Matrix | Aliphatic amine functionalized polyetherimide | Aliphatic amine functionalized polyetherimide | Aliphatic amine functionalized polyetherimide | Low molecular weight chloro-displaced polyetherimide |
| Fiber | CF-C | CF-B | CF-A | CF-B |
| Average Interfacial Shear Strength (MPa) | 74.2 | 61.4 | 57.7 | 58.6 |

Example 10

The purpose of this example was to determine the interfacial shear strength of a carbon fiber in a composite that included a polymer matrix of a low molecular weight chloro-displaced polyetherimide (Resin D) and a polyetherimide-sized carbon fiber (CF-B). A composite was made from a polyetherimide-sized carbon fiber and a low molecular weight chloro-displaced polyetherimide, pursuant to the specimen preparation method described above. Single fiber pull-out tests were performed as described above. The results indicated that the polyetherimide-sized carbon fiber had an interfacial shear strength that was 58.6 MPa.

Example 11

The purpose of this example was to determine the interfacial shear strength of a carbon fiber in a composite that included a polymer matrix of an aniline-terminated polyetherimide (Resin E) and an epoxy-sized carbon fiber (CF-C). A composite was made from an epoxy-sized carbon fiber and an aniline-terminated polyetherimide, pursuant to the composite specimen preparation method described above. Single fiber pull-out tests were performed as described above. The results indicated that the epoxy-sized carbon fiber had an interfacial shear strength that was 70.0 MPa.

Example 12

The purpose of this example was to determine the interfacial shear strength of a carbon fiber in a composite that included a polymer matrix of an aniline-terminated polyetherimide (Resin E) and a polyetherimide-sized carbon fiber (CF-B). A composite was made from a polyetherimide-sized carbon fiber and an aniline-terminated polyetherimide, pursuant to the specimen preparation method described above. Single fiber pull-out tests were performed as described above. The results indicated that the polyetherimide-sized carbon fiber had an interfacial shear strength that was 68.1 MPa.

Example 13 (Comparative)

The purpose of this example was to determine the interfacial shear strength of a carbon fiber in a composite that included a polymer matrix of an aniline-terminated polyetherimide (Resin E) and an non-sized carbon fiber (CF-A). A composite was made in accordance to the procedure of Example 13, except that the carbon fiber used was not sized. Single fiber pull-out tests were performed as described above. The results indicated that the non-sized carbon fiber had an interfacial shear strength that was 54.6 MPa. Table 6 summarizes the results of Examples 11-13.

TABLE 6

|  | EXAMPLE 11 | EXAMPLE 12 | EXAMPLE 13 (Comparative) |
|---|---|---|---|
| Polymer Matrix | Aniline-terminated polyetherimide | Aniline-terminated polyetherimide | Aniline-terminated polyetherimide |
| Fiber | CF-C | CF-B | CF-A |
| Average Interfacial Shear Strength (MPa) | 70.0 | 68.1 | 54.6 |

Figure 4:
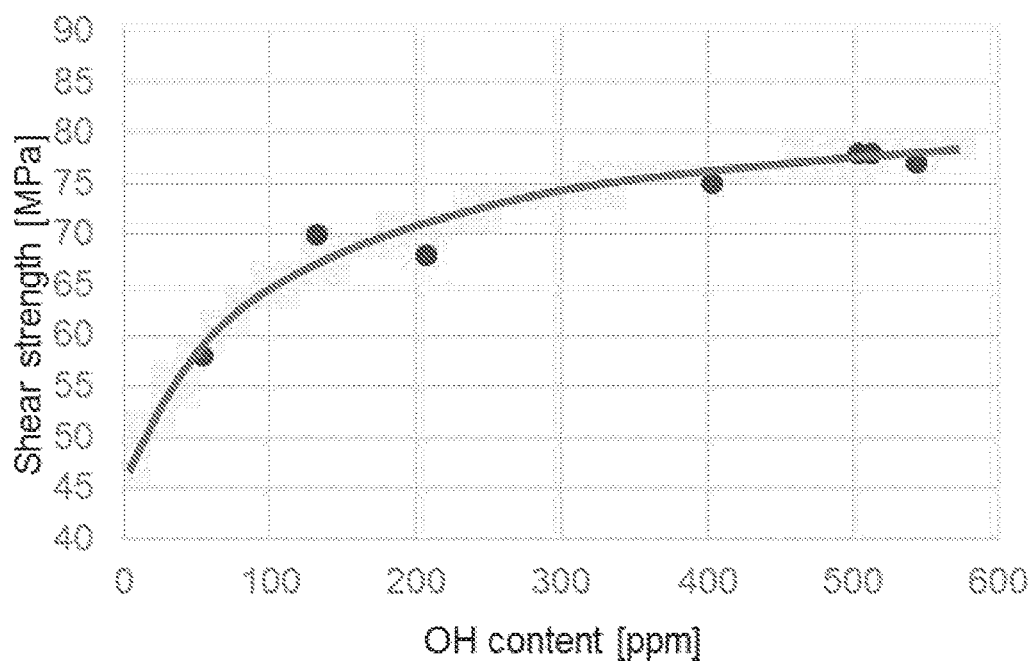
FIGS. 4 and 5 are graphs showing data from the examples.

The effect of the quantity of hydroxyl groups was also examined. Several batches of Resin B with varying levels of hydroxyl groups were tested as described above using CF-C. The results are shown in FIG. 4. As shown in FIG. 4, increasing hydroxyl group content in the polyetherimide results in greater pull out strength when the hydroxyl group content varies from 0 to 600 parts by weight per million (ppm).

Figure 5:
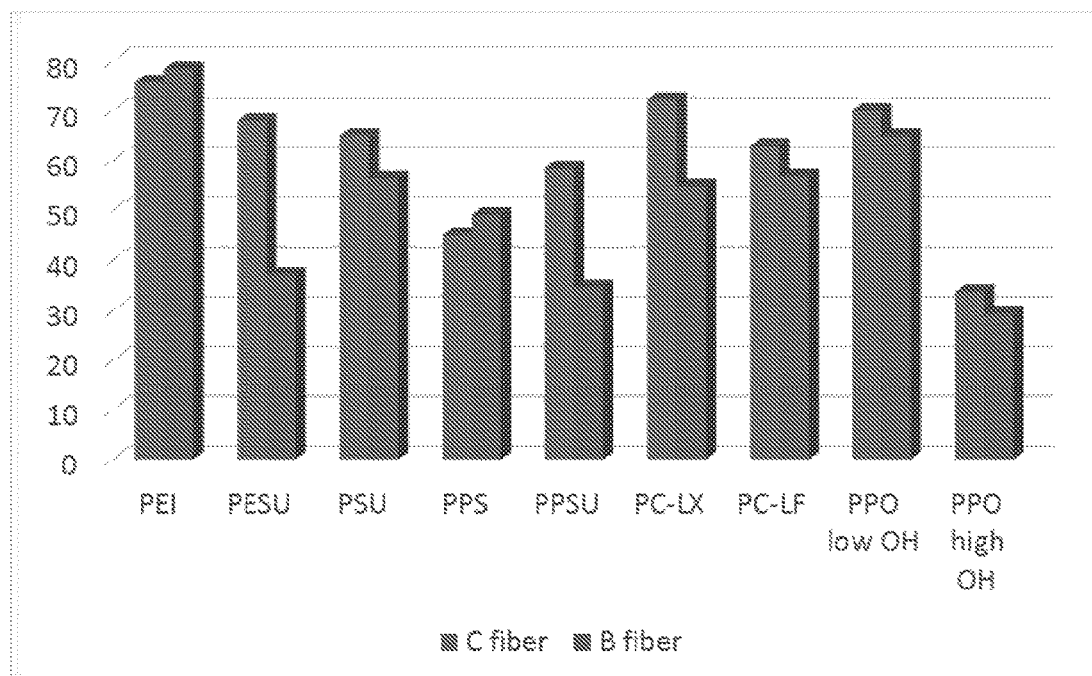

Some preliminary work was done with other resins such as polycarbonate and polyphenylene ether. The results of this work are shown in FIG. 5. It was found that increasing hydroxyl content in the polymer did not always lead to greater pull out strength. Notably, polyphenylene ether does not demonstrate the same relationship between hydroxyl content and pull out strength. The polyphenylene ether with lower hydroxyl content actually shows higher pull out strength than a polyphenylene ether with higher hydroxyl content when the carbon fiber has epoxy sizing.

Additionally, it was investigated and found that no reaction had occurred between the epoxy sizing and the polymer.

Embodiment 1

A composite comprising a matrix comprising a polymeric material; and at least one sized fiber selected from the group consisting of polyetherimide-sized fibers, epoxy-sized fibers, and combinations thereof, wherein the fiber is embedded in the matrix.

Embodiment 2

The composite of Embodiment 1, wherein the polymeric material comprises aromatic polyketone, polyetheretherketone, polyphenylsulfone, polybenzimidazoles, polyethersulfone, polysulfone, polycarbonate, polyphenylene ether, polyphenylene sulfide, a polyetherimide or a polyetherimide copolymer.

Embodiment 3

The composite of Embodiment 1, wherein the polymeric material comprises a polyetherimide of formula (4):

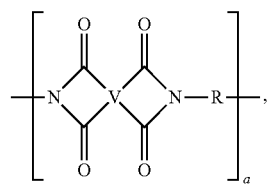

(4)

wherein a is more than 1, the group V in formula (4) is a (a) saturated, unsaturated or aromatic monocyclic and polycyclic group having 5 to 50 carbon atoms, substituted with an ether group; (b) linear or branched, saturated or unsaturated alkyl group having 1 to 30 carbon atoms substituted with ether group, or a combination of (a) and (b), R group is (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (5):

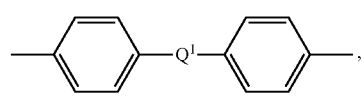

(5)

wherein $Q^1$ comprises —O—, —S—, —C(O)—, —SO$_2$—, —SO—, —C$_y$H$_{2y}$— wherein y is an integer from 1 to 5.

Embodiment 4

The composite of Embodiment 3, wherein the polyetherimide is end-capped.

Embodiment 5

The composite of Embodiment 4, wherein the polyetherimide is end-capped with para-cumyl phenol, an aliphatic amine, or an aromatic amine.

Embodiment 6

The composite of any of Embodiments 3 to 5, wherein the polyetherimide has a hydroxyl group content greater than or equal to 100 ppm and less than or equal to 600 ppm.

Embodiment 7

The composite of any of the Embodiments wherein the sized fiber comprises carbon fiber, glass fiber, aramid fiber, polyparaphenylene terephthalamide fiber, and combinations thereof.

Embodiment 8

The composite of any of the preceding Embodiments wherein the fiber has a sizing percentage of greater than 0 to 7 weight percent, based on the weight of the fiber.

Embodiment 9

The composite of any of the preceding Embodiments wherein the fiber has a diameter of 1 to 20 micrometers.

Embodiment 10

The composite of any of the preceding Embodiments wherein the fiber has a density of 0.5 to 7 grams per cubic centimeter.

Embodiment 11

The composite of Embodiment 3, wherein the polyetherimide has hydroxyl group content of 200 to 600 ppm and the sized fiber is epoxy sized carbon fiber.

Embodiment 12

The composite of Embodiment 11, wherein the fiber has a sizing percentage of greater than 0 to 7 weight percent, based on the weight of the fiber.

Embodiment 13

The composite of Embodiment 11 or 12, wherein the fiber has a diameter of 1 to 20 micrometers.

Embodiment 14

The composite of any one of Embodiments 11 to 13, wherein the fiber has a density of 0.5 to 7 grams per cubic centimeter.

Embodiment 15

The composite of any one of Embodiments 11 to 14, wherein the polyetherimide is para-cumyl phenol terminated polyetherimide and composite has an interfacial shear strength of 68 to 120 MPa.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

The invention may be understood more readily by reference to the detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A composite comprising a matrix comprising a polymeric material; and at least one sized fiber selected from the group consisting of polyetherimide-sized fibers, epoxy-sized fibers, and combinations thereof, wherein the fiber is embedded in the matrix, wherein the polymeric material comprises a polyetherimide of formula (4):

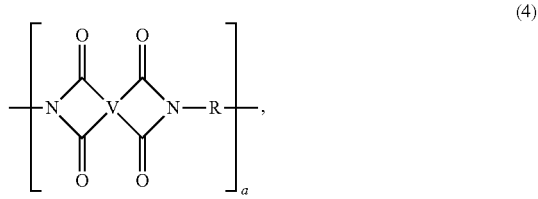

wherein a is more than 1, the group V in formula (4) is a (a) saturated, unsaturated or aromatic monocyclic or polycyclic group having 5 to 50 carbon atoms, substituted with an ether group; (b) linear or branched, saturated or unsaturated aliphatic hydrocarbyl group having 1 to 30 carbon atoms substituted with ether group, or a combination of (a) and (b), R group is (a) aromatic hydrocarbon groups having 6 to 20 carbon atoms halogenated derivatives thereof; (b) straight or branched chain alkylene groups having 2 to 20 carbon atoms; (c) cycloalkylene groups having 3 to 20 carbon atoms, or (d) divalent groups of formula (5):

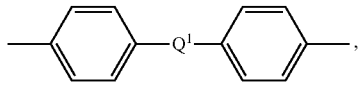

(5)

wherein $Q^1$ comprises —O—, —S—, —C(O)—, —SO$_2$—, —SO—, —C$_y$H$_{2y}$— wherein y is an integer from 1 to 5, and further wherein the polyetherimide has a hydroxyl group content greater than or equal to 100 ppm and less than or equal to 600 ppm.

2. The composite of claim 1, wherein the polymeric material further comprises aromatic polyketone, polyetheretherketone, polyphenylsulfone, polybenzimidazoles, polyethersulfone, polysulfone, polycarbonate, polyphenylene ether, polyphenylene sulfide, or a polyetherimide copolymer.

3. The composite of claim 1, wherein the polyetherimide is end-capped.

4. The composite of claim 3, wherein the polyetherimide is end-capped with para-cumyl phenol, an aliphatic amine, or an aromatic amine.

5. The composite of claim 1, wherein the sized fiber comprises carbon fiber, glass fiber, aramid fiber, polyparaphenylene terephthalamide fiber, or combinations thereof.

6. The composite of claim 1, wherein the fiber has a sizing percentage of greater than 0 to 7 weight percent, based on the weight of the fiber.

7. The composite of claim 1, wherein the fiber has a diameter of 1 to 20 micrometers.

8. The composite of claim 1, wherein the fiber has a density of 0.5 to 7 grams per cubic centimeter.

9. The composite of claim 1, wherein the polyetherimide has hydroxyl group content of 200 to 600 ppm and the sized fiber is epoxy sized carbon fiber.

10. The composite of claim 9, wherein the fiber has a sizing percentage of greater than 0 to 7 weight percent, based on the weight of the fiber.

11. The composite of claim 9, wherein the fiber has a diameter of 1 to 20 micrometers.

12. The composite of claim 9, wherein the fiber has a density of 0.5 to 7 grams per cubic centimeter.

13. The composite of claim 9, wherein the polyetherimide is para-cumyl phenol terminated polyetherimide and the composite has an interfacial shear strength of 68 to 120 MPa.

14. A composite comprising a polyetherimide matrix and at least one sized carbon fiber selected from the group consisting of polyetherimide-sized carbon fibers, epoxy-sized carbon fibers, and combinations thereof, wherein the carbon fiber is embedded in the matrix and further wherein the polyetherimide matrix has a hydroxyl group content greater than or equal to 100 ppm and less than or equal to 600 ppm.

15. The composite of claim 14, wherein the fiber has a sizing percentage of greater than 0 to 7 weight percent, based on the weight of the fiber.

16. The composite of claim 14, wherein the fiber has a density of 0.5 to 7 grams per cubic centimeter.

17. The composite of claim 14, wherein the polyetherimide matrix is a para-cumyl phenol terminated polyetherimide.

18. The composite of claim 14, wherein the polyetherimide matrix is an aliphatic amine terminated polyetherimide.

* * * * *